(12) United States Patent
Fiveland et al.

(10) Patent No.: US 9,334,813 B2
(45) Date of Patent: May 10, 2016

(54) CONTROL SYSTEM FOR A DUAL-FUEL ENGINE

(71) Applicant: Electro-Motive Diesel, Inc., La Grange, IL (US)

(72) Inventors: Scott B. Fiveland, Metamora, IL (US); Deep Bandyopadhyay, Naperville, IL (US); Edward J. Cryer, Homer Glen, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 497 days.

(21) Appl. No.: 13/755,588

(22) Filed: Jan. 31, 2013

(65) Prior Publication Data

US 2014/0209066 A1 Jul. 31, 2014

(51) Int. Cl.
*F02D 19/06* (2006.01)
*F02D 19/10* (2006.01)
(Continued)

(52) U.S. Cl.
CPC ............ *F02D 19/10* (2013.01); *F02D 19/0607* (2013.01); *F02D 19/0626* (2013.01); *F02D 19/0642* (2013.01); *F02D 19/0689* (2013.01); *F02D 19/0692* (2013.01); *F02D 19/081* (2013.01); *F02D 41/0027* (2013.01); *F02D 35/027* (2013.01); *F02D 41/0025* (2013.01); *F02D 2041/389* (2013.01); *F02D 2400/04* (2013.01); *Y02T 10/36* (2013.01)

(58) Field of Classification Search
CPC ... F02D 19/022; F02D 19/06; F02D 19/0602; F02D 19/0605; F02D 19/0642; F02D 19/0647; F02D 41/0027; F02D 19/10; F02D 19/0962; F02D 19/0626; F02D 19/0607; F02D 19/081; F02D 2400/04; F02M 21/0239

USPC ....... 123/525, 526, 575, 431, 299, 300, 73 C, 123/73 CC
See application file for complete search history.

(56) References Cited

U.S. PATENT DOCUMENTS 946,406 A 1/1910 Söhnlein
2,267,333 A 12/1941 Jacoby et al.
(Continued)

FOREIGN PATENT DOCUMENTS

EP 0432153 B1 6/1991
EP 2441941 A2 4/2012
(Continued)

*Primary Examiner* — Lindsay Low
*Assistant Examiner* — Robert Werner
(74) *Attorney, Agent, or Firm* — Finnegan, Henderson, Farabow, Garrett & Dunner, LLP

(57) ABSTRACT

A control system for a dual-fuel engine is disclosed. The control system may have a gaseous fuel injector having a nozzle located at a first air intake port of a cylinder of the engine and configured to inject a variable amount of gaseous fuel radially into the cylinder based on at least one of a load and speed of the engine. The control system may also have a liquid fuel injector configured to inject a fixed amount of liquid fuel axially into the cylinder based on the at least one of the load and speed of the engine. The control system may additionally have a regulator configured to selectively adjust a flow of gaseous fuel to the gaseous fuel injector and at least one sensor configured to generate a signal indicative of a performance parameter of the engine. The control system may also have a controller in communication with the regulator and the at least one sensor. The controller may be configured to selectively cause the regulator to adjust the flow of gaseous fuel based on the signal.

21 Claims, 2 Drawing Sheets

(51) Int. Cl.
*F02D 19/08* (2006.01)
*F02D 41/00* (2006.01)
*F02D 35/02* (2006.01)
*F02D 41/38* (2006.01)

(56) References Cited

U.S. PATENT DOCUMENTS

| | | | |
|---|---|---|---|
| 2,367,029 A | | 1/1945 | Jameson |
| 2,686,503 A | * | 8/1954 | Reddy et al. ............... 123/27 GE |
| 2,767,691 A | | 10/1956 | Mengelkamp et al. |
| 4,088,098 A | | 5/1978 | Rose et al. |
| 4,091,772 A | | 5/1978 | Heater et al. |
| 4,527,516 A | * | 7/1985 | Foster ....................... 123/27 GE |
| 4,579,093 A | | 4/1986 | Eanes |
| 4,679,538 A | | 7/1987 | Foster |
| 4,957,089 A | | 9/1990 | Morikawa |
| 5,035,206 A | | 7/1991 | Welch et al. |
| 5,251,580 A | | 10/1993 | Torigai |
| 5,271,357 A | | 12/1993 | Hsu et al. |
| 5,357,919 A | | 10/1994 | Ma |
| 5,367,999 A | * | 11/1994 | King et al. .................... 123/458 |
| 5,370,097 A | | 12/1994 | Davis |
| 5,517,954 A | | 5/1996 | Melchior |
| 5,588,402 A | | 12/1996 | Lawrence |
| 5,787,864 A | * | 8/1998 | Collier et al. ................. 123/492 |
| 6,240,892 B1 | | 6/2001 | Sweeney |
| 6,318,344 B1 | | 11/2001 | Lucier et al. |
| 6,523,529 B1 | | 2/2003 | Moncelle |
| 6,640,792 B2 | | 11/2003 | Harvey et al. |
| 6,675,748 B2 | | 1/2004 | Ancimer et al. |
| 6,708,905 B2 | * | 3/2004 | Borissov et al. ............. 239/584 |
| 7,019,626 B1 | * | 3/2006 | Funk ............................. 340/438 |
| 7,021,558 B2 | | 4/2006 | Chenanda et al. |
| 7,028,918 B2 | | 4/2006 | Buchanan et al. |
| 7,090,145 B2 | | 8/2006 | Baker et al. |
| 7,168,241 B2 | | 1/2007 | Rudelt et al. |
| 7,207,321 B2 | | 4/2007 | Vadimovitch et al. |
| 7,225,793 B2 | | 6/2007 | Schwulst et al. |
| 7,343,895 B2 | | 3/2008 | Mark |
| 7,481,048 B2 | | 1/2009 | Harmon et al. |
| 8,051,830 B2 | | 11/2011 | Taylor |
| 8,056,326 B2 | | 11/2011 | Cox et al. |
| 2004/0149255 A1 | | 8/2004 | zur Loye et al. |
| 2009/0084346 A1 | | 4/2009 | Zhou et al. |
| 2012/0073264 A1 | | 3/2012 | Li et al. |
| 2012/0199102 A1 | * | 8/2012 | Hoefer et al. ................. 123/458 |

FOREIGN PATENT DOCUMENTS

| | | |
|---|---|---|
| EP | 2602460 | 6/2013 |
| JP | 5202756 A | 8/1993 |
| WO | WO 2011/002351 A1 | 1/2011 |
| WO | WO 2011/002353 A1 | 1/2011 |
| WO | WO 2011/139932 A1 | 11/2011 |
| WO | 2012018071 | 2/2012 |
| WO | 2012057691 | 5/2012 |
| WO | 2013183737 | 12/2013 |

* cited by examiner

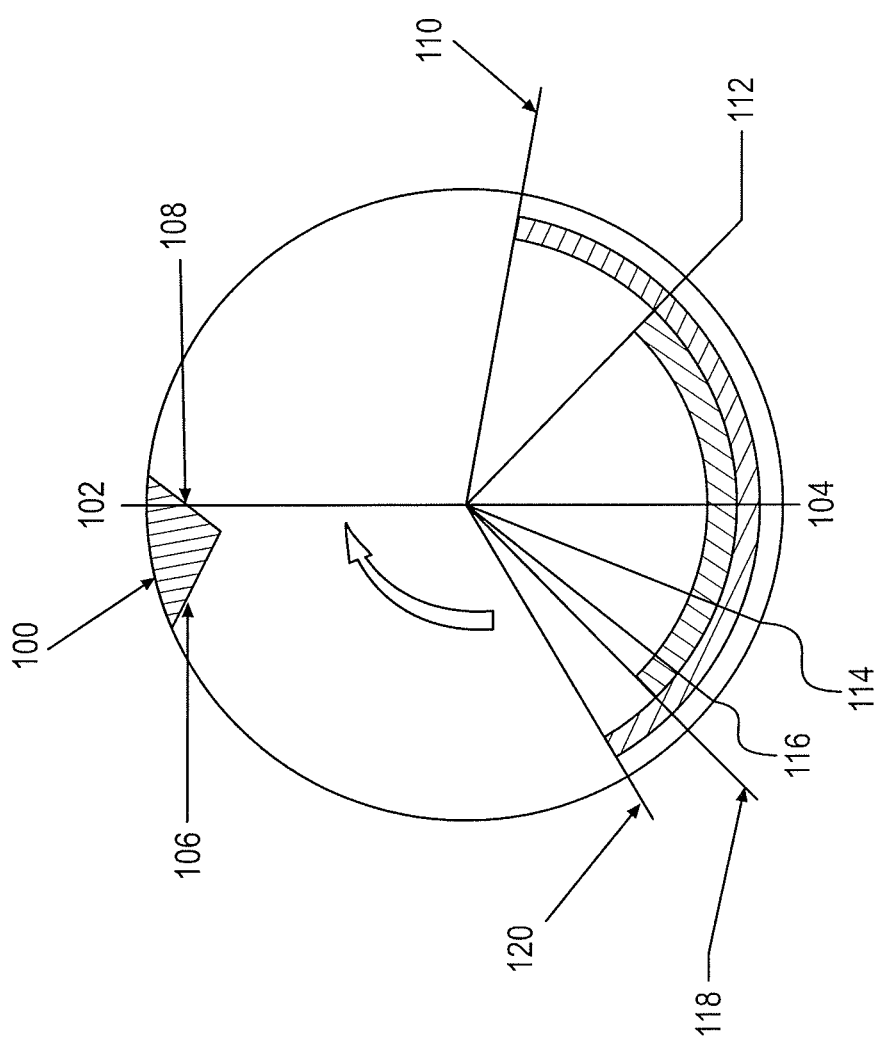

CONTROL SYSTEM FOR A DUAL-FUEL ENGINE

TECHNICAL FIELD

The present disclosure is directed to a control system and, more particularly, to a control system for a dual-fuel engine.

BACKGROUND

Due to the rising cost of liquid fuel (e.g. diesel fuel) and ever increasing restrictions on exhaust emissions, engine manufacturers have developed dual-fuel engines. An exemplary dual-fuel engine provides injections of a low-cost gaseous fuel (e.g. natural gas) through air intake ports of the engine's cylinders. The gaseous fuel is introduced with clean air that enters through the intake ports and is ignited by liquid fuel that is injected during each combustion cycle. Because a lower-cost fuel is used together with liquid fuel, cost efficiency may be improved. In addition, the combustion of the gaseous and liquid fuel mixture may result in a reduction of harmful emissions.

In these dual-fuel engines, particular attention may be directed to pressures, flow rates, and timing of the gaseous and liquid fuels injected into the cylinder. If these parameters are not tightly controlled, the engine may not perform as expected.

An exemplary control system for a dual-fuel engine is disclosed in U.S. Pat. No. 4,527,516 to Foster. In particular, the '516 patent discloses a dual-fuel engine that includes an inlet pipe connected at one end to a gas source and at an opposite end to the side of an engine cylinder via an inlet port. The '516 patent also includes an electronically controlled gas admission valve to control the timing of the gas entry into the cylinder via the inlet pipe. The gas admission valve controls a parameter of the gas flow to meet engine requirements, but does not rely on feedback for control purposes. Instead, the valve only includes feed-forward control to meet given fuel specifications.

Although perhaps adequate for some applications, the control system of the '516 patent may be less than optimal. In particular, because the control system only uses feed-forward control, it may not account for variations in environmental factors and/or aging factors that can have an effect on system performance.

The disclosed control system is directed to overcoming one or more of the problems set forth above and/or other problems of the prior art.

SUMMARY

In one aspect, the present disclosure is directed to a control system for a dual-fuel engine. The control system may include a gaseous fuel injector having a nozzle located at a first air intake port of a cylinder of the engine and configured to inject a variable amount of gaseous fuel radially into the cylinder based on at least one of a load and speed of the engine. The control system may also include a liquid fuel injector configured to inject a fixed amount of liquid fuel axially into the cylinder based on the at least one of the load and speed of the engine. The control system may additionally include a regulator configured to selectively adjust a flow of gaseous fuel to the gaseous fuel injector, and at least one sensor configured to generate a signal indicative of a performance parameter of the engine. The control system may also include a controller in communication with the regulator and the at least one sensor. The controller may be configured to selectively cause the regulator to adjust the flow of gaseous fuel based on the signal.

In another aspect, the present disclosure is directed to a method of controlling operation of a dual-fuel engine. The method may include injecting a variable amount of gaseous fuel radially through a first air intake port of a cylinder of the engine based on at least one of a load and speed of the engine, and injecting a fixed amount of liquid fuel axially into the cylinder based on the at least one of the load and speed of the engine. The method may additionally include sensing a performance parameter of the engine and selectively adjusting the amount of gaseous fuel injected based on the performance parameter.

BRIEF DESCRIPTION OF THE DRAWINGS

FIG. 2 is an exemplary disclosed timing diagram associated with the control system of FIG. 1.

DETAILED DESCRIPTION

Figure 1:
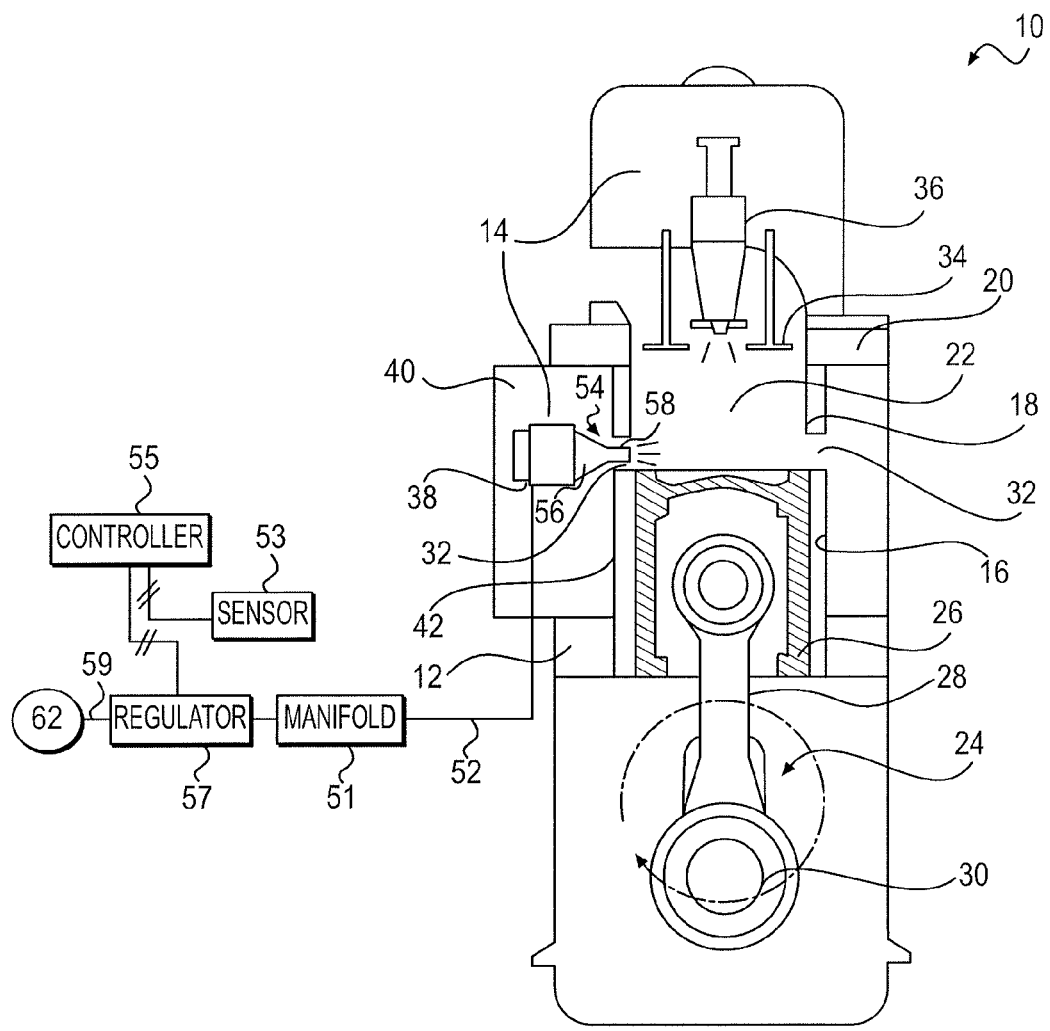
FIG. 1 is a cross-sectional illustration of a dual-fuel engine equipped with an exemplary disclosed control system.

FIG. 1 illustrates an exemplary internal combustion engine 10. Engine 10 is depicted and described as a two-stroke dual-fuel engine. Engine 10 may include an engine block 12 that at least partially defines a plurality of cylinders 16 (only one shown), each having an associated cylinder head 20. A cylinder liner 18 may be disposed within each engine cylinder 16, and cylinder head 20 may close off an end of liner 18. A piston 24 may be slidably disposed within each cylinder liner 18. Each cylinder liner 18, cylinder head 20, and piston 24 may together define a combustion chamber 22 that receives fuel from a fuel system 14 mounted to engine 10. It is contemplated that engine 10 may include any number of engine cylinders 16 with corresponding combustion chambers 22.

Within engine cylinder liner 18, piston 24 may be configured to reciprocate between a bottom-dead-center (BDC) or lower-most position, and a top-dead-center (TDC) or upper-most position. In particular, piston 24 may be an assembly that includes a piston crown 26 pivotally connected to a rod 28, which may in turn be pivotally connected to a crankshaft 30. Crankshaft 30 of engine 10 may be rotatably disposed within engine block 12 and each piston 24 coupled to crankshaft 30 by rod 28 so that a sliding motion of each piston 24 within liner 18 results in a rotation of crankshaft 30. Similarly, a rotation of crankshaft 30 may result in a sliding motion of piston 24. As crankshaft 30 rotates through about 180 degrees, piston crown 26 and connected rod 28 may move through one full stroke between BDC and TDC. Engine 10, being a two-stroke engine, may have a complete cycle that includes a power/exhaust/intake stroke (TDC to BDC) and an intake/compression stroke (BDC to TDC).

During a final phase of the power/exhaust/intake stroke described above, air may be drawn into combustion chamber 22 via one or more gas exchange ports (e.g., air intake ports) 32 located within a sidewall of cylinder liner 18. In particular, as piston 24 moves downward within liner 18, a position will eventually be reached at which air intake ports 32 are no longer blocked by piston 24 and instead are fluidly communicated with combustion chamber 22. When air intake ports 32 are in fluid communication with combustion chamber 22 and a pressure of air at air intake ports 32 is greater than a pressure within combustion chamber 22, air will pass through air intake ports 32 into combustion chamber 22. It is contemplated that gaseous fuel (e.g. methane or natural gas), may be introduced into combustion chamber 22 (e.g. radially injected) through at least one of air intake ports 32. The gaseous fuel may mix with the air to form a fuel/air mixture within combustion chamber 22.

Eventually, piston 24 will start an upward movement that blocks air intake ports 32 and compresses the air/fuel mixture. As the air/fuel mixture within combustion chamber 22 is compressed, a temperature of the mixture may increase. At a point when piston 24 is near TDC, a liquid fuel (e.g. diesel or other petroleum-based liquid fuel) may be injected into combustion chamber 22 via a liquid fuel injector 36. The liquid fuel may be ignited by the hot air/fuel mixture, causing combustion of both types of fuel and resulting in a release of chemical energy in the form of temperature and pressure spikes within combustion chamber 22. During a first phase of the power/exhaust/intake stroke, the pressure spike within combustion chamber 22 may force piston 24 downward, thereby imparting mechanical power to crankshaft 30. At a particular point during this downward travel, one or more gas exchange ports (e.g., exhaust ports) 34 located within cylinder head 20 may open to allow pressurized exhaust within combustion chamber 22 to exit and the cycle will restart.

Liquid fuel injector 36 may be positioned inside cylinder head 20 and configured to inject liquid fuel into a top of combustion chamber 22 by releasing fuel axially towards an interior of cylinder liner 18 in a generally cone-shaped pattern. Liquid fuel injector 36 may be configured to cyclically inject a fixed amount of liquid fuel, for example, depending on a current engine speed and/or load. In one embodiment, engine 10 may be arranged to run on liquid fuel injections alone or a smaller amount of liquid fuel mixed with the gaseous fuel. The gaseous fuel may be injected through air intake port 32 into combustion chamber 22 via any number of gaseous fuel injectors 38. The gaseous fuel may be injected radially into combustion chamber 22 through a corresponding air intake port 32 after the air intake port 32 is opened by movement of piston 24. The amount of gaseous fuel injected into combustion chamber 22 may vary based on the engine load and/or speed, as well as based on a monitored performance parameter, as will be described in more detail below.

Engine 10, utilizing fuel system 14, may consume two types of fuels when it is run as a dual-fuel engine. It is contemplated that the gaseous fuel may produce between 40% and 85% of a total energy output of engine 10. For example, the gaseous fuel may produce between 60% and 65% of the total energy output, with the liquid fuel producing the remaining 35% to 40%. In any case, the liquid fuel can act as an ignition source such that a smaller amount will be necessary than what is needed for engine 10 if it were running on only liquid fuel.

As depicted in FIG. 1, fuel system 14 may include various supply components. The supply components may include an individual fuel supply line 52 for each gaseous fuel injector 38. A supply manifold 51, a common flow regulator 57, and a fuel supply 62 may be included to supply the gaseous fuel to the individual fuel supply line(s) 52. Fuel supply 62 may represent a fuel tank or other container configured to serve as a fuel reservoir. Fuel supply 62 may supply gaseous fuel to common regulator 57 via a common fuel supply line 59. Common flow regulator 57 may be controlled to adjust an upstream parameter (e.g. pressure, flow rate, injection timing, etc.) of the gaseous fuel and direct the gaseous fuel into fuel supply manifold 51. Supply manifold 51 may be connected to each individual fuel supply line 52 for supplying fuel to each gaseous fuel injector 38. Supply line 52 and gaseous fuel injector 38 may both be positioned inside air box 40.

Gaseous fuel injector 38 may be mounted directly to a wall 42 of engine block 12 inside air box 40 or to cylinder liner 18, such that a nozzle 54 of gaseous fuel injector 38 is in direct communication with one of air intake ports 32 of an adjacent engine cylinder 16. Nozzle 54 may be a converging nozzle having a converging portion 56 and a tip 58 connected at a distal end of converging portion 56. Tip 58 may create an axial flow path for gaseous fuel directed towards the center axis of cylinder 16. Converging portion 56 may increase upstream pressure of gaseous fuel to be injected into cylinder 16 through downstream tip 58. Converging portion 56 may have an included angle of about 60° relative to a center axis, with other angles in the range of about 50 to 70° possible.

The upstream/downstream pressure ratio of gaseous fuel created by nozzle 54 may need to be controlled in order to achieve critical or choked flow. For the purposes of this disclosure, choked flow may be defined as flow through nozzle 54 that is substantially unaffected by variations in downstream pressure as long as the upstream pressure is fixed. Choked flow may help achieve optimal fuel penetration to approximately the center of combustion chamber 22. In one embodiment, in which the gaseous fuel is methane, the minimum ratio of upstream to downstream pressure for accomplishing choked flow is approximately 1.84. Regardless of gaseous fuel type, utilizing a choked flow may set the downstream pressure of fuel such that the flow of air through surrounding air intake ports 32 is overcome and the gaseous fuel penetrates to the center of combustion chamber 22. In order to help accomplish this gaseous fuel penetration, it is contemplated that the downstream pressure of injected gaseous fuel may be approximately 0.5-4 bar greater than the pressure of air inducted into combustion chamber 22. This difference in pressures may be necessary to allow gaseous fuel to enter cylinder 16 during the short window of time in which air intake ports 32 are open to fluidly connect air box 40 with combustion chamber 22.

Common flow regulator 57 may be capable of adjusting the pressure of gaseous fuel entering gaseous fuel injector 38 to achieve the desired downstream pressure and choked flow through nozzle 54. Engine 10 may include a control system to regulate gaseous fuel injections via adjustments by common flow regulator 57. The control system may include a sensor 53 and a controller 55. Based on signals generated by sensor 53, controller 55 may adjust the fuel flow via common flow regulator 57 to maintain desired performance. Sensor 53 may be mounted at any suitable location inside or near engine 10 for monitoring a performance parameter related to operation of engine 10. Sensor 53 may be connected to controller 55 for providing information (by generating electronic signals) indicative of the parameter to controller 55. Controller 55 may interpret these signals and adjust the fuel flow via common flow regulator 57 accordingly.

Sensor 53 may represent a performance sensor positioned at one or more air intake ports 32 for gauging the flow of air and/or fuel through the respective air intake ports 32. For example, sensor 53 may be placed at an air intake port 32 adjacent the air intake port 32 housing nozzle 54 of gaseous fuel injector 38. In this scenario, sensor 53 may be a pressure sensor configured to gauge the pressure of air coming into cylinder 16 from air box 40. Alternatively, sensor 53 may be positioned at an air intake port 32 on a side of cylinder 16 opposite from gaseous fuel injector 38. In that case, sensor 53 may be a fuel sensor configured to detect fuel from gaseous fuel injector 38 that has exited cylinder 16 through respective air intake port 32. In both embodiments, sensor 53 may send information about the flow of air and/or fuel to controller 55, which may relay instructions to common flow regulator 57 to responsively adjust the pressure and/or flow rate of the fuel. Sensor 53 could take different shapes and/or be placed at different locations in order to efficiently gauge target parameters. It is also contemplated that multiple sensors 53, monitoring the same and/or different parameters, may also be used, if desired.

It is also contemplated that sensor 53 may be utilized to detect a presence of an exhaust constituent (e.g. nitrous oxides (NOx), particulate matter, hydrocarbons, carbon monoxide, carbon dioxide, etc) above a threshold level, as the performance parameter. The control system may adjust flow of gaseous fuel in response to undesirable levels of the particular exhaust constituent monitored by sensor 53 to cause a reduction of the relevant emission.

In an alternative embodiment, sensor 53 may represent a knock sensor that may be placed at any suitable location on or near engine block 12 to provide information to controller 55 regarding the dual-fuel combustion. For example, knock sensor 53 may be configured to detect a frequency of a pressure wave created by fuel combustion within combustion chamber 22 or otherwise measure a condition of the combustion process. If the condition meets a certain threshold, such as a measured frequency outside of a target range, engine knock (i.e. some degree of incomplete fuel combustion) may be present. Knock sensor 53 may be in communication with controller 55 and configured to provide controller 55 with a signal indicative of the combustion process. If adjustments are determined to be necessary, controller 55 may signal common injector regulator 57 to adjust a parameter of only injected gaseous fuel until the condition measured by knock sensor 53 is inside of the target range.

FIG. 2 illustrates a timing diagram of an exemplary dual-fuel engine. FIG. 2 will be discussed in detail in the following section to further illustrate the disclosed concepts.

INDUSTRIAL APPLICABILITY

Fuel system 14 may be used in a new dual-fuel engine or retrofitted into an existing single-fuel engine. Fuel system 14 may be a substitute for a single-fuel system in order to utilize the associated engine in a cleaner and more cost-efficient manner. A control system may be provided to help ensure efficient use of fuel system 14. Efficient control may be possible through the use of a sensor 53 to monitor a critical parameter and provide feedback to fuel system 14 through a controller 55. Specifically, feedback from the control system may be utilized to adjust gaseous fuel injection based on an operating condition, such as load and/or speed of engine 10. This may be advantageous since liquid fuel injector 36 may be driven mechanically in a cyclical manner without any input from the control system. That is, liquid fuel injector 36 may be configured to inject the same amount of liquid fuel for each combustion cycle (i.e., for a given loading condition and/or speed of engine 10) regardless of variations in environmental factors, aging factors, etc.

FIG. 2 is an exemplary timing diagram 100 associated with operation of engine 10 and fuel system 14. Engine operation may commence when an operator turns a key to start engine 10. Fuel may be pumped from fuel reservoirs (e.g. fuel supply 62) to each cylinder 16. At startup, engine 10 may run conventionally on only liquid fuel injections near TDC 102 (between a liquid injection starting point 106 and a liquid injection ending point 108), although it is possible for initial combustion cycles to include both fuels. After startup, and as piston 24 moves towards BDC 104 on its power/exhaust/intake stroke, exhaust ports 34 may be opened near a point 110. Piston 24 may continue downwardly until piston crown 26 begins to uncover air intake ports 32 at a corresponding point 112 in FIG. 2. Once piston crown 26 passes the bottom of air intake ports 32, ports 32 may be fully open. Gaseous fuel may then be injected from gaseous fuel injector 38 during a time period between corresponding points 114 and 116 while air intake ports 32 are open. Also during this time period, air may enter cylinder 15 from air box 40. As piston 24 moves upwardly from BDC 104, piston crown 26 will gradually close air intake ports 32. Air intake ports 32 may be completely closed at a point 118. All gaseous fuel injection may occur before this point is reached. It is contemplated that gaseous fuel will be injected during about 25% to 40% of the full time period between 112 and 118 in which air intake ports 32 are open. In one embodiment, this injection time (between 114 and 116) occurs only during the second half of this time period, when piston 24 is in its intake/compression stroke. After gaseous fuel is injected and intake ports 32 are closed, exhaust ports 34 may close near a point 120. Before reaching TDC 102, liquid fuel injection may start at point 106. As piston 24 finishes its intake/compression stroke, the injected liquid fuel may cause combustion of the overall fuel mixture, thereby restarting the cycle.

The flow of air and fuel into and out of cylinder 16 may be monitored by sensor 53 to allow for adjustments, if necessary. For example, a pressure adjustment may be required if the pressure of fuel injected into air intake port 32 is insufficient to overcome the pressure of air entering cylinder 16 through air intake ports 32. The air pressure may be monitored at an air intake port 32 adjacent to the air intake port 32 in which gaseous fuel is injected. Data collected by sensor 53 may be sent to controller 55 and interpreted (by comparison to data from regulator 57 or a separate sensor in gaseous fuel injector 38) to determine if a fuel pressure adjustment is necessary to achieve a desired pressure differential (about 2-4 bar) between the downstream fuel injection and the intake air. If a pressure adjustment is necessary, controller 55 may send instructions to common flow regulator 57 to adjust the fuel flow rate to gaseous fuel injector 38 such that the injection pressure is brought into the desired range. It is also contemplated that sensor 53 may monitor other operating conditions, such as temperature, velocity, timing, and the like, data from which may be translated into instructions for controlling the system to ensure a strong flow of fuel into the cylinder.

For example, sensor 53 may be utilized to detect fuel slippage out of air intake ports 32. Sensor 53 may be positioned outside of an air intake port 32 on a side of cylinder 16 opposite gaseous fuel injector 38 to detect fuel that has exited cylinder 16. If fuel is detected, or if the amount of fuel detected exceeds a threshold level, the pressure of the injected gaseous fuel may be adjusted by controller 55 via common flow regulator 57. Use of sensor 53 with the control system in this manner may contribute to greater fuel retention inside cylinder 16 and therefore improved efficiency of fuel system 14.

Another option may be to utilize sensor 53 as a knock sensor to monitor fuel combustion within combustion chamber 22. Pressure of the gaseous fuel injected by gaseous fuel injector 38 may be increased by common flow regulator 57 until knock sensor 53 detects a threshold pressure wave frequency created by fuel combustion that signals engine knock. Sensor 53 may relay information to controller 55 to reduce the pressure of injected gaseous fuel via common flow regulator 57 until combustion occurs without knocking.

During or after a given combustion cycle, sensor 53 may sense a parameter outside of a desired range. If so, sensor 53 may generate a signal indicative of the parameter and send the signal to controller 55. Controller 55 may interpret these signals and direct instructions to common flow regulator 57 (or an individual flow regulators within gaseous fuel injectors 38, if present) to adjust a parameter (e.g. pressure, flow rate, timing, etc.) such that the flow may be optimized to satisfy the desired range monitored by sensor 53. This type of dynamic control system may be beneficial to allow fuel system 14 and engine 10 to operate efficiently while adapting to changes in operating conditions.

It will be apparent to those skilled in the art that various modifications and variations can be made to the disclosed engine and control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A control system for a dual-fuel engine, comprising:
    a gaseous fuel injector having a nozzle located at a first air intake port of a cylinder of the engine and configured to inject a variable amount of gaseous fuel radially into the cylinder based on at least one of a load and a speed of the engine;
    a liquid fuel injector configured to inject a fixed amount of liquid fuel axially into the cylinder based on the at least one of the load and the speed of the engine;
    a regulator configured to selectively adjust a flow of gaseous fuel to the gaseous fuel injector;
    at least one sensor positioned at a second air intake port of the cylinder and configured to generate a first signal indicative of a first performance parameter of the engine wherein the first performance parameter is a presence of gaseous fuel that has exited the cylinder through a second air intake port; and
    a controller in communication with the regulator and the at least one sensor, the controller being configured to selectively cause the regulator to adjust the flow of gaseous fuel based on the signal.

2. The control system of claim 1, wherein the at least one sensor is configured to generate a second signal indicative of a second performance parameter of the engine, wherein the second performance parameter is a pressure of air entering the cylinder through the second air intake port.

3. The control system of claim 1, wherein the gaseous fuel contributes about 40-85% of a total energy produced by fuel combustion inside the cylinder.

4. The control system of claim 3, wherein the gaseous fuel contributes about 60-65% of the total energy produced by fuel combustion.

5. The control system of claim 1, wherein the liquid fuel injector is mechanically driven in a cyclical manner.

6. The control system of claim 1, wherein the controller is configured to maintain a downstream injection pressure of fuel entering the cylinder at approximately 0.5-4 bar greater than a pressure of air entering the cylinder through the second air intake port.

7. The control system of claim 1, wherein the performance parameter is a presence of an exhaust constituent above a threshold level.

8. The control system of claim 1, wherein the performance parameter is frequency of a pressure wave created by fuel combustion.

9. The control system of claim 1, wherein the gaseous fuel injector is configured to begin and end a gaseous fuel injection during a time period in which the first air intake port is open.

10. The control system of claim 9, wherein the liquid fuel injector is configured to begin a liquid fuel injection after the end of the gaseous fuel injection.

11. A method of controlling operation of a dual-fuel engine, comprising:
    injecting a variable amount of gaseous fuel radially through a first air intake port of a cylinder of the engine based on at least one of a load and speed of the engine;
    injecting a fixed amount of liquid fuel axially into the cylinder based on the at least one of the load and speed of the engine;
    sensing a first performance parameter of the engine wherein the first performance parameter is a presence of gaseous fuel that has exited the cylinder through a second air intake port; and
    selectively adjusting the amount of gaseous fuel injected based on the performance parameter.

12. The method of claim 11, further comprising: sensing a second performance parameter of the engine, wherein the second performance parameter is a pressure of air entering the cylinder through a second air intake port.

13. The method of claim 11, wherein adjusting gaseous fuel injection includes adjusting a pressure of gaseous fuel injected into the cylinder to a pressure that is about 0.5-4 bar greater than a pressure of air entering the cylinder.

14. The method of claim 11, wherein injecting the gaseous fuel includes injecting the gaseous fuel for about 25-40% of a time period during which the first air intake port is open.

15. The method of claim 14, wherein injecting the gaseous fuel includes injecting the gaseous fuel during a second half of the time period during which the first air intake port is open.

16. The method of claim 11, wherein injecting the variable amount of gaseous fuel includes directing gaseous fuel through a converging nozzle configured to choke the flow of gaseous fuel.

17. The method of claim 11, wherein the gaseous fuel contributes about 40-85% of a total energy produced by fuel combustion inside the cylinder.

18. The method of claim 17, wherein the gaseous fuel contributes about 60-65% of the total energy produced by fuel combustion.

19. The method of claim 11, wherein the performance parameter is a presence of an exhaust constituent above a threshold level.

20. The method of claim 11, wherein the performance parameter is a frequency of a pressure wave created by fuel combustion.

21. A dual-fuel engine, comprising:
    an engine block defining a plurality of cylinders;
    an air box connected to a side of the engine block;
    a cylinder liner disposed in each of the plurality of cylinders and having a plurality of air intake ports;
    a cylinder head associated with each of the plurality of cylinders;
    a piston disposed within each of the plurality of cylinders;
    a combustion chamber at least partially defined by the cylinder liner, the cylinder head, and the piston;
    a gaseous fuel injector having a nozzle located at a first air intake port of each of the plurality of cylinders and configured to inject a variable amount of gaseous fuel radially through the air intake port based on at least one of a load and a speed of the engine;
    a liquid fuel injector configured to inject a fixed amount of liquid fuel axially into the cylinder based on at least one of the load and the speed of the engine;
    a regulator configured to selectively adjust a flow of gaseous fuel to the gaseous fuel injector;

at least one sensor positioned at a second air intake port of the cylinder and configured to generate a signal indicative of a performance parameter of the engine wherein the performance parameter is a presence of gaseous fuel that has exited the cylinder through a second air intake port; and a controller in communication with the regulator and the at least one sensor, the controller being configured to selectively cause the regulator to adjust the flow of gaseous fuel based on the signal.

* * * * *